United States Patent [19]

Posey

[11] Patent Number: 4,710,157

[45] Date of Patent: Dec. 1, 1987

[54] FORMER FOR FORM, FILL AND SEAL PACKAGING MACHINE

[75] Inventor: John Posey, McHenry, Ill.

[73] Assignee: Baxter Travenol Laboratories, Inc., Deerfield, Ill.

[21] Appl. No.: 902,038

[22] Filed: Aug. 25, 1986

Related U.S. Application Data

[63] Continuation of Ser. No. 697,542, Feb. 1, 1985, abandoned.

[51] Int. Cl.$^4$ .................. B31B 23/36; B31B 23/90
[52] U.S. Cl. ........................ 493/213; 493/248; 493/254; 493/302; 493/439
[58] Field of Search ............... 493/193, 210, 211, 212, 493/213, 214, 215, 248, 254, 297, 302, 439, 470; 53/321, 410, 450, 486, 568

[56] References Cited

U.S. PATENT DOCUMENTS

| | | | |
|---|---|---|---|
| 523,499 | 7/1894 | Windle | 493/439 |
| 1,499,254 | 6/1924 | Rocklin | 493/439 |
| 2,323,629 | 7/1943 | Spanel | 493/254 |
| 2,619,057 | 11/1952 | Ellis | 493/439 |
| 3,069,303 | 12/1962 | Scholle | 493/213 |
| 3,351,963 | 11/1967 | Rapisarda | 493/380 |
| 3,482,491 | 12/1969 | Gustafson . | |
| 3,486,424 | 12/1969 | Tanner | 493/468 |
| 3,492,278 | 2/1970 | Dohmeier . | |
| 3,553,934 | 1/1971 | Johnson et al. . | |
| 3,597,237 | 8/1971 | Nughes . | |
| 3,675,542 | 7/1972 | Torigoe | 493/194 |
| 3,868,891 | 3/1975 | Parish | 493/213 |
| 3,873,082 | 3/1975 | Imaizjmi et al. | 493/341 |
| 4,050,361 | 9/1977 | Traise | 493/439 |
| 4,055,032 | 10/1977 | Hammond | 493/213 |
| 4,166,412 | 9/1979 | Versteege | 493/193 |
| 4,285,686 | 8/1981 | Ambler . | |
| 4,394,936 | 7/1983 | Shavit | 493/213 |
| 4,566,250 | 1/1986 | Matsumura et al. | 53/128 |

FOREIGN PATENT DOCUMENTS

8116/66 7/1966 Australia .

Primary Examiner—Frederick R. Schmidt
Assistant Examiner—William E. Terrell
Attorney, Agent, or Firm—John P. Kirby, Jr.; Robert M. Barrett; Paul C. Flattery

[57] ABSTRACT

A form, fill and seal apparatus for producing flexible containers having fitments located at one end of the container. The invention provides a former for folding into a tubular shape a substantially flat web of film with attached fitments. The former includes a substantially V-shaped member, an elongated member secured to the V-shaped member, and a U-shaped member. The V-shaped member, elongated member, the U-shaped member cooperate to fold the substantially flat web of film to bring opposite longitudinal portions thereof into aligned relationship.

16 Claims, 5 Drawing Figures

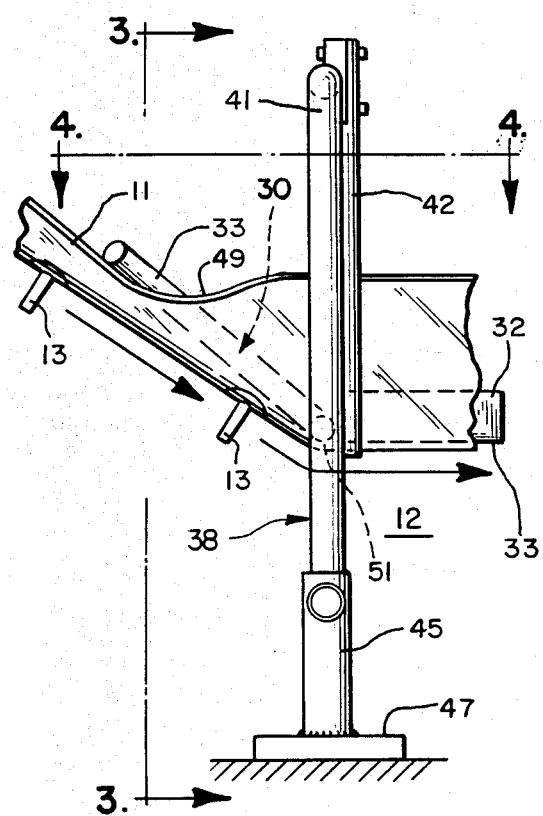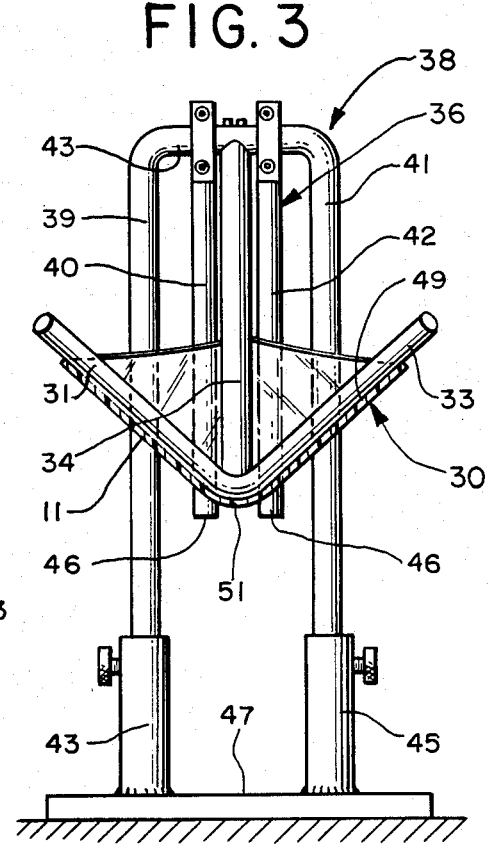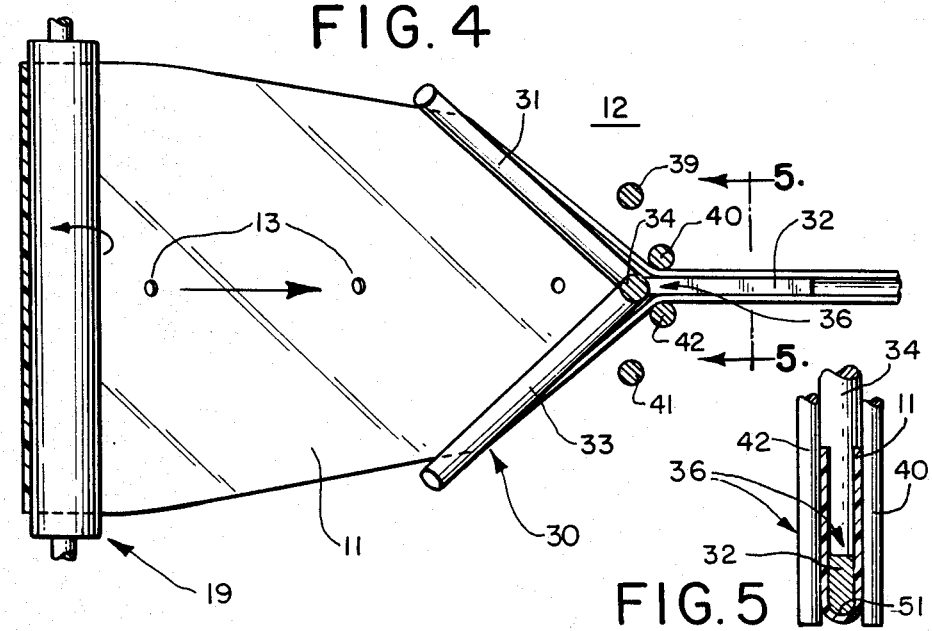

FORMER FOR FORM, FILL AND SEAL PACKAGING MACHINE

This application is a continuation, of application Ser. No. 697,542, filed Feb. 1, 1985 now abandoned.

BACKGROUND OF THE INVENTION

The invention relates to an apparatus for producing flexible containers from a web of film. In particular, the present invention relates to a former for a form, fill and seal packaging machine.

Form, fill and seal packaging machines are utilized to produce, from a web of flexible film, a flexible container containing material to be dispensed. Form, fill and seal packaging machines are utilized to seal pharmaceuticals, dairy products, wine, food stuffs, cosmetics, nutritional products, and other products in flexible containers. The form, fill and seal packaging machine provides an apparatus for packaging these products in an expedient manner.

Typically, a former provides means for folding, or aligning, opposite sides of the web of substantially flat film so that the film may be created into flexible containers. To this end, the former typically forms the film into a tubular shape. This tubular shape is usually effectuated by folding longitudinally the substantially flat web of film.

In some types of packaging arts including, inter alia, pharmaceutical, food products, nutritional products, and dairy products, it is desirable to make flexible containers that include means for accessing the container (hereinafter "fitments"). As used herein, the term fitments includes, without limitation, valves, ports, port enclosure assemblies, and other means for accessing a container. Fitments provide means for establishing fluid communication between a container and the outside environment. An example of a container utilizing a fitment is the VIAFLEX ® flexible container for parenteral solutions produced by Travenol Laboratories, Inc. of Deerfield, Ill.

Typically, due to the construction of the prior art formers and form, fill and seal apparatus, if fitments are to be attached to the web of film, the web of film is first folded into the tubular shape and then the fitments are attached. Because the fitments are attached after the web of film is folded, this produces a slower and more difficult process of attaching fitments compared to if the fitments were attached when the film was substantially flat, i.e. not folded.

In typical pharmaceutical and nutritional packages it is desirable to orient the fitment at one end of the flexible container. If the fitment is attached to the film before the film is folded this necessitates that the fitment is located in the center of the film. Thus, if the film is formed after the fitment is attached, it is necessary that the former is able to "handle" film with a fitment located in the center of the web of film.

When the fitment is located at an end of the flexible container it is desirable that the fitment has a substantially curved base that conforms to the end of the flexible container. This is usually achieved by heating the base of the fitment when the fitment is attached to the web of film. This presents a further problem attaching the fitment to the web of film prior to the film being folded in a tubular shape. If the fitment is attached to a substantially flat web of film it may not be desirable to curve the base prior to the film being formed into a tubular shape; the curved base may interfere with the flow of the film through the form, fill and seal apparatus.

In certain arts, specifically pharmaceuticals and nutrition, it is necessary to package the products in a sterile, aseptic environment. Accordingly, it is important that the parts of the form, fill and seal packaging machine do not contaminate the product or film. Therefore, it is important that the former is not a harbour for bacteria and other contaminates.

Thus, there is a need for an improved former that overcomes the disadvantages of the prior art.

SUMMARY OF THE INVENTION

The present invention provides a form, fill and seal apparatus for producing flexible containers having fitments located at one end of the container. The invention includes a former for folding into a tubular shape a substantially flat web of film with attached fitments. The former includes a substantially V-shaped member, an elongated member secured to the V-shaped member and a U-shaped member. The V-shaped member, elongated member, and U-shaped member cooperate to fold the substantially flat web of film to bring opposite longitudinal portions thereof into aligned relationship.

Preferably, the V-shaped member includes two coplanar legs located at angles of approximately 60° to about 75° to each other. Preferably, the V-shaped member extends from the elongated member at an angle of approximately 120° to about 145°.

The elongated member may include a heater for heating the base of the attached fitment. The former may include a support member including two legs and a cross bar. The U-shaped member may comprise two rods extending from the cross bar.

Accordingly, it is an advantage of the present invention to provide a former for a form, fill and seal packaging machine.

Another advantage of the present invention is that it provides a former that can form a substantially flat web of film with attached fitments into a tubular shape.

A still further advantage of the present invention is that it provides a former for use in an aseptic form, fill and seal packaging machine.

An additional advantage of the present invention is that it provides a form, fill and seal packaging machine wherein the fitments may be attached to a web of substantially flat film before the film is formed into a tubular shape.

Moreover, an advantage of the present invention is that it provides a former that includes a heating member for heating the base of the fitment.

Another advantage of the present invention is that the former is substantially integral so that it is not a harbour for bacteria and other contaminants in an aseptic form, fill and seal packaging machine.

A still further advantage of the present invention is that it provides a former wherein the fitments may be attached in the middle of the substantially flat web of film and formed into flexible containers with fitments located at an end of the container.

A further an advantage of the present invention is that the former may be used with a variety of film compositions and fitment constructions.

Additional features and advantages are described in, and will be apparent from, the Detailed Description of the Presently Preferred Embodiments and from the drawings.

BRIEF DESCRIPTION OF THE DRAWINGS

FIG. 2 illustrates a side elevational view of a preferred embodiment of the former of this invention.

FIG. 3 illustrates a front elevational view of the former of FIG. 1 taken along lines 3—3.

FIG. 3 illustrates a top elevational view of the former of FIG. 1 taken along lines 4—4.

FIG. 5 illustrates a cross-sectional portion of the former of FIG. 1 taken along lines 5—5 of FIG. 4.

DETAILED DESCRIPTION OF THE PRESENTLY PREFERRED EMBODIMENTS

Figure 1:
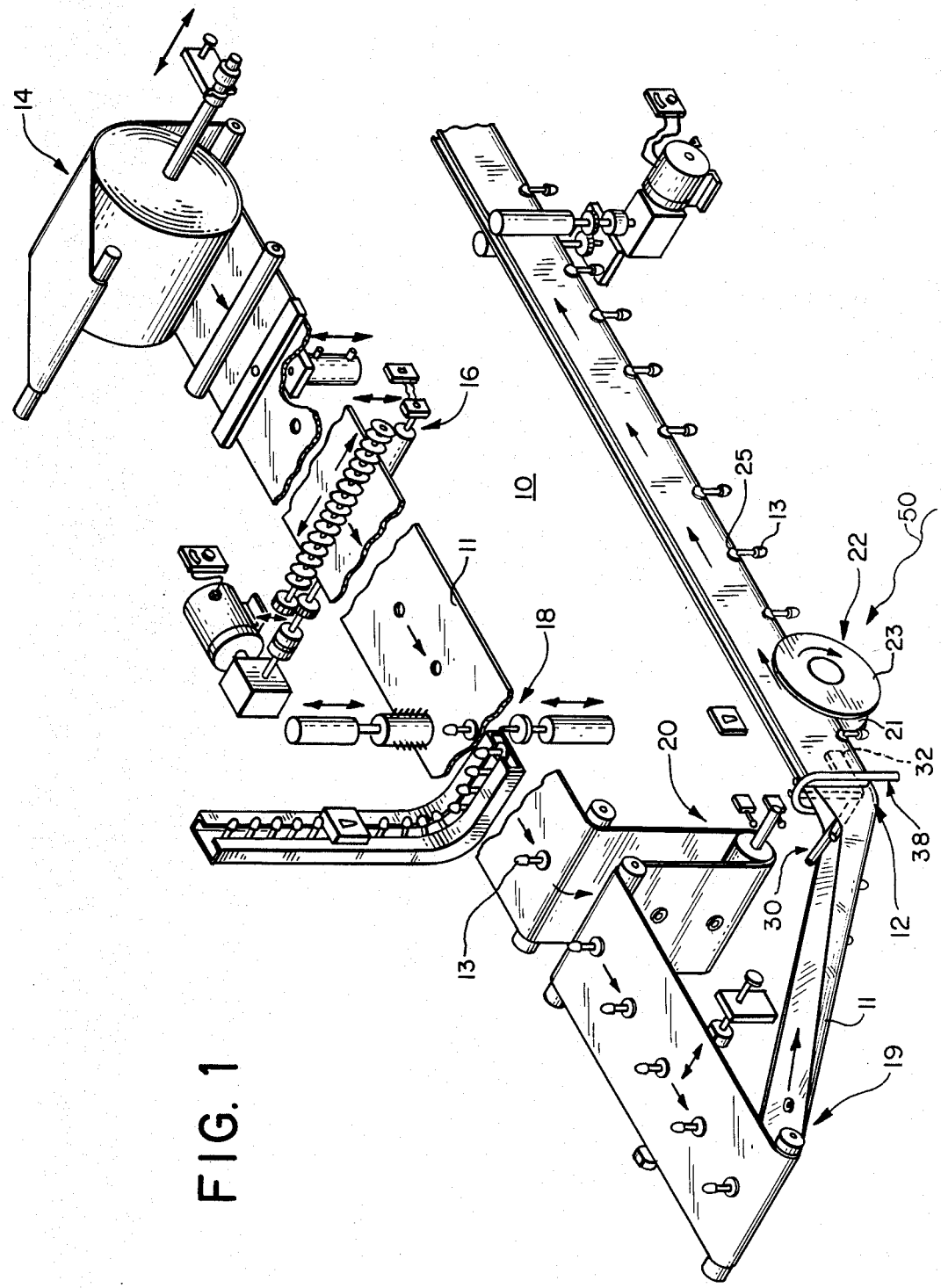
FIG. 1 illustrates a schematic view of the form, fill and seal packaging apparatus of this invention.

Referring to FIG. 1, the form, fill and seal packaging apparatus 10 of the present invention is illustrated. The form, fill and seal packaging apparatus 10 is designed to produce from a web of film 11 a flexible container containing a solid or fluid to be extracted.

Briefly, the form, fill and seal apparatus 10 includes a supply of film 14, that is fed to an indexing apparatus 16. The form, fill and seal packaging apparatus 10 further includes a fitment attaching apparatus 18 that attaches a fitment 13 to the web of substantially flat film 11. After a fitment 13 has been attached to the web of film 11 the film advances to an accumulation station 20 that promotes the transition from intermittent to continuous flow of the film through the form, fill and seal apparatus 10. From the accumulation station 20 the web of film 11, with attached fitments 13, then moves to a tracking roller 19. From the tracking roller 19 the film 11 moves to the former 12. The web of film 11 then passes through the former 12 and a fitment post forming device 22. After passing through the fitment post forming device 22 the web of film 11, with attached fitments 13, then moves to a sealer (not shown) where end seals are effectuated in the web of film 11. The film 11 is then filled at a fill station (not shown) with a material to be packaged, sealed and cut into individual flexible containers.

The sealer and fill station may be any sealer and fill station known in the art. Likewise, the fitment attaching apparatus 18 may be any fitment attaching apparatus known in the art that attaches fitments to a flexible web of film.

The fitment post forming apparatus 22 functions to form the curved base 25 of the fitment 13 after the elongated member 32, and specifically the heater means, softens the base 25. To this end, two rollers 21 and 23 cool the base 25 so that it retains its formed shape. The two rollers 21 and 23 are driven so that they rotate in the direction of the flow of film 11. Preferably, the rollers 21 and 23 are constructed from aluminum or other material with good heat transfer properties. The rollers 21 and 23 are preferably cooled with chilled water shown schematically at 50. The rollers 21 and 23 may be cooled by a rotary union.

The distance from the tracking roller 19 to the former 12 is important. It has been found that with a ten inch wide web of film 11, the distance from the former 12 to the tracking roller 19 is preferably twenty inches. If the distance between the tracking roller 19 and former 12 is too great or small you get unstable tracking. The angle of the tracking roller 19 and former 12 is also important. It has been found that with a ten inch wide web of film 11 preferably the angle is approximately 35°.

Referring to FIGS. 2-5, the former 12 of the present invention is illustrated. The former 12 is constructed so that a web of film 11 with attached fitments 13 may be formed into a tubular shape that can be filled and sealed. The former 12 allows fitments 13 to be attached either to the inside or outside of the web of film 11 before the film is formed into a tubular shape.

The former 12 includes a V-shaped member 30 and an elongated member 32. The V-shaped member 30 functions to guide the film 11 with attached fitments 13 into a V-folded shape. The V-shaped member 30 includes two coplanar legs 31 and 33. Preferably, the coplanar legs 31 and 33 are rod-like members. The length of the coplanar legs 31 and 33 is a function of the width of the web of film 11. Preferably, the coplanar legs 31 and 33 extend from each other at an angle of approximately 60° to about 75°. Preferably, the V-shaped member extends from the elongated member 32 at an angle of 120° to about 145°.

Preferably, the elongated member 32 is rectangularly shaped and extends from an end of the V-shaped member 30. It should be noted that as long as the bottom 33 of the elongated member 32 is flat the elongated member may have any shape. The elongated member 32 also helps to maintain the film 11 in a tubular shape. The elongated member 32 may include heating means (not illustrated) for heating the base of the fitment 13 so that it takes on a substantially curved shape. The heating means may comprise any tubular heater known in the art. A tubular heater made by Watlow has been found to function satisfactory as the heating means.

In the embodiment illustrated in FIGS. 3-5, the V-shaped member 30 and elongated member 32 are supported by a center rod 34. Preferably, the V-shaped member 30 extends from the center rod 34 at an angle of approximately 40° to about 50°. The center rod 34 in turn is attached to and supported by a supporting member 38. The supporting member 38 includes two legs 39 and 41, and a cross bar 43. As illustrated, the legs 39 and 41 may be secured to adjustable members 43 and 45. The adjustable members 43 and 45 are secured to a base 47 and allow the user to adjust the height of the former 12. It should be noted that the legs 39 and 41 could be welded directly to the base 47.

The former 12 also includes a U-shaped member 36. As described in more detail below, the U-shaped member 36 helps to maintain the film 11 in a tubular shape after it has passed by the V-shaped member 30. The U-shaped member 36 helps to align the fitments 13 as the film 11 is folded into a tubular shape. As illustrated in the embodiment set forth in FIGS. 2 and 5, the U-shaped member 36 comprises two parallel rods 40 and 42 that extend from the support member 38. The portion 46 of the parallel rods 40 and 42 that extends below the elongated member 32 functions to center the fitments 13 as the film 11 with attached fitments passes through the form, fill and seal apparatus 10. I should be noted that the supporting member 38 may be constructed so that it functions as the U-shaped member 36.

As illustrated, in use, a first side 49 of the web of film 11 contacts the V-shaped member 30 and a second side 51 of the web of film 11 contacts the U-shaped member 36. Due to the shape of the V-shaped member 30 and the U-shaped member 36 the web of film 11 with attached fitments 13 may be shaped into a tubular shape and then subsequently sealed, filled and sealed to create a flexible container. Furthermore, the construction of the former allows the fitments 13 to be attached to the center of the web of film 11.

Preferably, the V-shaped member 30, the elongated member 32, and the center member 34 are integral. By being integral they do not provide a harbour for bacteria and other contaminants so that the former 12 may be used in an aseptic form, fill and seal packaging machine 10. Preferably the V-shaped member 30, center member 34, and elongated member 32 are constructed from stainless steel or other metals, plastic, nylon, polyvinyl chloride, or any other material, especially a material that may be coated with, for example, Teflon. Type 316 stainless steel has been found to work satisfactory. Preferably the U-shaped member 36 is constructed from stainless steel or other metals, plastic, nylon, polyvinyl chloride, or any other material, especially a material that may be coated with, for example, Teflon. Type 316 stainless steel has been found to work satisfactory. Preferably the support member 38 is constructed from stainless steel or other metals, plastic, nylon, polyvinyl chloride, or any other material, especially a material that may be coated with, for example, Teflon. Type 316 stainless steel has been found to work satisfactory.

It is believed that the former 12 of this invention may be used with most films known in the art to create flexible containers in a form, fill and seal apparatus. Likewise, the former 12 may also be used with most fitments for flexible containers known in the art.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. In an apparatus for producing flexible containers having fitments located at one end of the container, an apparatus for folding into a substantially U-shape a substantially flat web of film with attached fitments, the apparatus for producing flexible containers including means for supplying the web of film to the apparatus for folding comprising:

a substantially V-shaped member;
   an elongated member extending from the substantially V-shaped member;
   support means for supporting the V-shaped member and elongated member, the V-shaped member and elongated member being secured to the support means;
   two parallel rods extending from the support means;
   the elongated member, V-shaped member, and parallel rods cooperating to provide means for folding the web of film substantially along the fitments; and
   means for shaping a base of the attached fitments located at a position downstream of the apparatus for folding.

2. The apparatus of claim 1 wherein the means for shaping a base includes two rollers.

3. An apparatus for producing from a web of flexible film flexible pouches having a fitment located at one end comprising:

means for attaching a fitment to the film;
   a former for aligning opposite longitudinal portions of the film, the former including a substantially V-shaped member, an elongated member secured to the V-shaped member and extending downstream therefrom, the elongated member being received within a channel defined by the film when the opposite longitudinal portions of the film are aligned, support means for supporting the V-shaped member and elongated member, and means for maintaining the film with aligned opposite longitudinal portions;
   means for feeding the film with attached fitments to the former; and
   a base former for forming a base of the fitment, so that the base takes on a substantially curved shape, located downstream of the former, and means for feeding the web of film from the former to the base former.

4. The apparatus of claim 3 wherein the base former includes two rollers.

5. The apparatus of claim 4 wherein:
   the web of film is fed by the means for feeding the film in a first direction; and
   the rollers rotate in the first direction.

6. An apparatus for producing from a web of flexible film flexible pouches having a fitment located at one end comprising:

means for attaching a fitment to the film;
   means for feeding the film with attached fitment to a former;
   the former including means for aligning opposite longitudinal portions of the film;
   the means for aligning opposite longitudinal portions including a substantially V-shaped member, an elongated member secured to the V-shaped member, support means for supporting the V-shaped member and elongated member, and means for maintaining the film with aligned opposite longitudinal portions;
   the elongated member of the former including means for heating the fitments;
   a base former for forming the base of the fitment attached to the web of film so that the base takes on a substantially curved shape, the base former being located downstream of the former; and
   means for feeding the film from the former to the base former.

7. The apparatus of claim 6 wherein the base former includes two rollers.

8. The apparatus of claim 7 wherein:
   the web of film is fed by the means for feeding the film in a first direction; and
   the rollers rotate in the first direction.

9. The apparatus of claim 6 wherein the base former includes means for cooling the heated fitments.

10. The apparatus of claim 9 wherein the means for cooling are two rotatable rollers.

11. The apparatus of claim 10 wherein the rollers are cooled by chilled water.

12. An apparatus for producing from a web of film flexible pouches having a fitment located at one end comprising:

means for attaching a fitment to the film;
   a former including means for aligning opposite longitudinal portions of the film including a substantially V-shaped member, an elongated member secured to the V-shaped member and extending in a substantially horizontal plane downstream therefrom, support means for supporting the V-shaped member and elongated member, and means for maintaining the film with aligned opposite longitudinal portions;

means for feeding the film with attached fitment to the former;

a base former for forming the base of the fitment attached to the web of film so that the base takes on a substantially curved shape, the base former being located downstream of the former; and means for feeding the film from the former to the base former.

13. The apparatus of claim 12 wherein the elongated member of the former includes means for heating the base of the fitment.

14. The apparatus of claim 13 wherein the base former includes means for cooling the heated base of the fitment.

15. The apparatus of claim 14 wherein the means for cooling includes two rotatable rollers.

16. The apparatus of claim 15 wherein the rollers are cooled by water.

* * * * *